US006994195B2

(12) United States Patent
Brace et al.

(10) Patent No.: US 6,994,195 B2
(45) Date of Patent: Feb. 7, 2006

(54) CLUTCH RELEASE MECHANISM

(75) Inventors: Michael Wayne Brace, Maysville, KY (US); Michael Hill, West Union, OH (US)

(73) Assignee: Emerson Power Transmission Manufacturing, L.P., Marysville, KY (US)

( * ) Notice: Subject to any disclaimer, the term of this patent is extended or adjusted under 35 U.S.C. 154(b) by 0 days.

(21) Appl. No.: 10/936,165

(22) Filed: Sep. 8, 2004

(65) Prior Publication Data

US 2005/0252743 A1 Nov. 17, 2005

Related U.S. Application Data

(63) Continuation of application No. 10/843,912, filed on May 12, 2004, now abandoned.

(51) Int. Cl.
*F16D 67/02* (2006.01)
(52) U.S. Cl. ................. 192/12 B; 188/82.3; 192/223.2
(58) Field of Classification Search ............. 192/223.2, 192/12 B; 188/82.3; 74/411.5
See application file for complete search history.

(56) References Cited

U.S. PATENT DOCUMENTS

| 1,887,936 | A | * | 11/1932 | Lamb | 192/219.2 |
| 2,038,985 | A | * | 4/1936 | Browne | 192/219.1 |
| 3,247,935 | A | * | 4/1966 | Marland | 188/82.84 |
| 4,548,316 | A | * | 10/1985 | Maurer | 198/832.2 |
| 4,650,046 | A | * | 3/1987 | Parsons | 192/219.1 |
| 4,697,675 | A | * | 10/1987 | Johnson et al. | 74/411.5 |
| 4,867,291 | A | * | 9/1989 | Holman et al. | 192/219.3 |
| 5,366,053 | A | * | 11/1994 | Yant | 192/219.2 |
| 5,695,030 | A | * | 12/1997 | Medcalf, Jr. | 192/220.2 |
| 2004/0163934 | A1 | * | 8/2004 | Kanaris | 198/783 |

FOREIGN PATENT DOCUMENTS

WO  WO 01/94244 A1 * 12/2001

* cited by examiner

*Primary Examiner*—Rodney H. Bonck
(74) *Attorney, Agent, or Firm*—Harness, Dickey & Pierce, P.L.C.

(57) ABSTRACT

A clutch mechanism connects a rotating shaft to an outer clutch member having a clutch keyway. The clutch mechanism permits the shaft to rotate in a normal direction and prevents the shaft from rotating in a reverse direction when the outer clutch member is rotationally fixed to the housing. A key is moveable into an engaged position with the clutch keyway to rotationally fix the outer clutch member to the housing. The key is also moveable into a disengaged position to permit the outer clutch member to rotate relative to the housing. Thus, the shaft is permitted to rotate in both the normal direction and the reverse direction. A positive, mechanical and/or visual indication of whether the shaft is capable of operating in both directions may also be included. The assembly may include a sealed interior space in common with the machine including the shaft.

10 Claims, 3 Drawing Sheets

CLUTCH RELEASE MECHANISM

CROSS-REFERENCE TO RELATED APPLICATION

This application is a continuation application of U.S. patent application Ser. No. 10/843,912 filed on May 12, 2004 now abandoned.

FIELD OF THE INVENTION

The present invention relates to clutches adapted to rotate in a single direction only.

BACKGROUND OF THE INVENTION

Clutches that are adapted to rotate in a single direction only are useful regarding backstopping, overrunning, indexing and/or overload protection. These clutches are affixed to a shaft of the mechanical device or machine in such a fashion as to allow the machine to operate in one direction only. To keep the machine from operating in the opposite direction, the clutch mechanism mechanically locks the shaft of the mechanical device to a fixed, non-rotating member when the mechanical device attempts to operate opposite of the normal, or in an undesired, direction. This mechanical latching mechanism is typically part of the clutch itself, and may generally consist of a series of ratchets and pawls, a series of eccentric cams, a series of roller bearings and ramps, or any number of mechanical means by which to lock the shaft to a fixed, non-rotating member. In many cases, the non-rotating member includes a clutch housing that is attached to a fixed base member.

It has been found that there are instances where it is desirable to permit the shaft to rotate in the locked or opposite direction, despite the presence of the single direction clutch. This may occur, for example, if the machine that is driven by the shaft becomes jammed or otherwise needs servicing. Unfortunately, it has been necessary to disassemble the clutch and/or to disassemble the clutch housing from attachment to a fixed base member in order to release the clutch. This can be problematic and time consuming for many reasons. For example, many of these clutch mechanisms are located in a non-rotating, fixed housing that shares an interior space with the machine to which it is attached. Thus, the clutch and machine often share the lubricating oil of the machine, such as a gear reducer or a motorized conveyor pulley. Consequently, it can be difficult, and possibly even unsafe, to open the machine and/or to disassemble the clutch housing to release the clutch.

SUMMARY OF THE INVENTION

In accordance with one aspect of the present invention, a clutch assembly including a release mechanism is provided. The clutch assembly includes a fixed, non-rotating housing. A clutch mechanism is attached to a rotating shaft. The clutch mechanism is adapted to permit the shaft to rotate in a normal direction and to prevent the shaft from rotating in a reverse direction when the clutch mechanism is mechanically locked to the housing. The clutch mechanism is further adapted to permit the shaft to rotate in both the normal direction and the reverse direction when the clutch mechanism is mechanically unlocked from the housing. A locking member is adapted to be moved between an engaged position and a disengaged position. In the engaged position, the locking member mechanically locks the clutch mechanism to the housing. In the disengaged position, the locking member mechanically unlocks the clutch mechanism from the housing.

In accordance with another aspect of the present invention, a clutch assembly including a release mechanism is provided. The clutch assembly includes a fixed, non-rotating housing defining an interior space. A clutch mechanism is located within the interior space and connects a rotating shaft to a locking member. The clutch mechanism is adapted to permit the shaft to rotate in a normal direction and to prevent the shaft from rotating in a reverse direction when the locking member is prevented from rotating inside the housing. The clutch mechanism is further adapted to permit the shaft to rotate in both the normal direction and the reverse direction when the locking member is permitted to rotate inside the housing. A cooperating locking member is associated with the interior of the housing and is adapted to be moved between an engaged position and a disengaged position. In the engaged position, the cooperating locking member cooperates with the locking member of the clutch mechanism to prevent the locking member from rotating inside the housing. In the disengaged position, the cooperating locking member permits the locking member of the clutch to rotate inside the housing. A manipulation feature is adapted to enable movement of the cooperating locking member from the engaged position to the disengaged position in response to manipulation from outside the interior space of the housing.

In accordance with yet another aspect of the present invention, a clutch assembly including a release mechanism is provided. The clutch assembly includes a fixed, non-rotating housing having a housing keyway. A clutch mechanism connects a rotating shaft to an outer clutch member having a clutch keyway. The clutch mechanism is adapted to permit the shaft to rotate in a normal direction and to prevent the shaft from rotating in a reverse direction when the outer clutch member is rotationally fixed to the housing. The clutch mechanism is further adapted to permit the shaft to rotate in both the normal direction and the reverse direction when the outer clutch member is not rotationally fixed to the housing. A key is adapted to be moved into an engaged position wherein the key extends into both the housing keyway and the clutch keyway to rotationally fix the outer clutch member to the housing. The key is also adapted to be moved into a disengaged position wherein the key does not extend into both the housing keyway and the clutch keyway, thereby permitting the outer clutch member to rotate relative to the housing.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
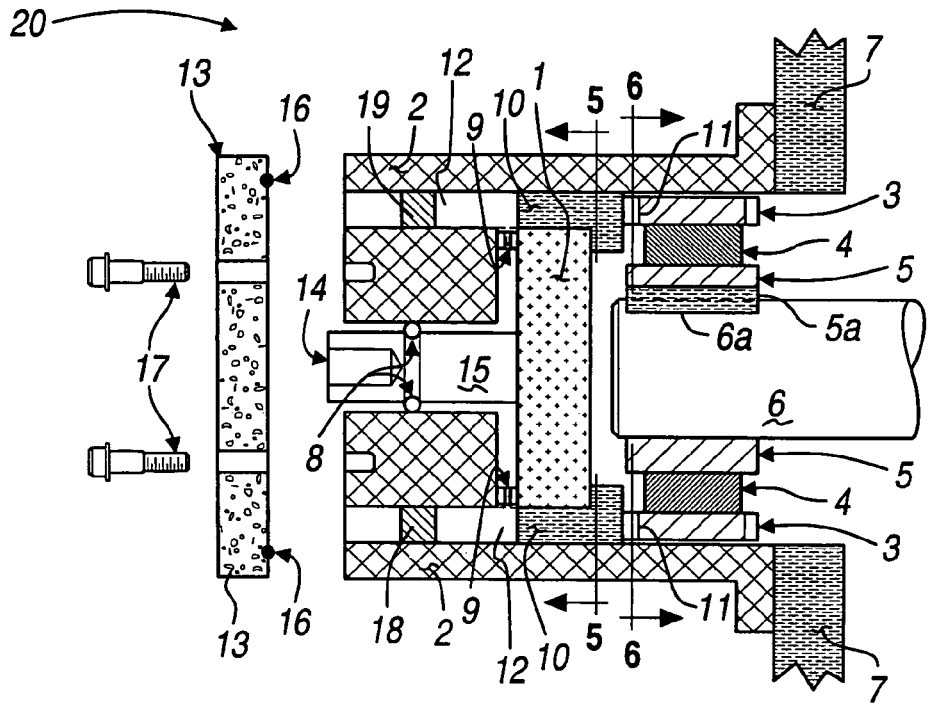
FIG. 1 is a longitudinal cross-sectional illustration of one preferred embodiment of a clutch assembly according to the present invention in the disengaged state.

The following description of the preferred embodiment(s) is merely exemplary in nature and is in no way intended to limit the invention, its application, or uses. For example, although the clutch mechanism is illustrated and described herein with reference to a series of roller bearings and ramped surfaces, any alternative clutch mechanism, including ratchets and pawls or a series of eccentric cams, may be used.

Referring to FIGS. 1 through 6, one preferred embodiment of a clutch assembly 20 according to the present invention is illustrated. The clutch assembly 20 is attached to an end of a shaft 6 which is, for example, a motor shaft. The shaft 6 is also typically part of a machine including housing component 7. When engaged, the clutch assembly 20 is designed to allow the shaft 6 to rotate in a single direction only. The clutch assembly 20 includes a release mechanism (including keys 10) that, when moved to a disengaged position, allows the shaft 6 to rotate in either direction.

In the illustrated embodiment, the clutch assembly 20 includes a piston 1 with keys 10 affixed thereto. This piston 1 and the keys 10 are constrained from rotation, but free to transfer longitudinally, in keyways 12 located in housing 2. The housing 2 is prevented from rotation by attachment to a fixed, non-rotating base member 7. As a result, neither the keys 10, nor any of the components illustrated in FIGS. 1 and 2 that are to the left of the keys 10 are rotating components. For example, housing 2, keys 10, piston 1, and piston shaft 15 are all constrained from rotation, due to their direct or indirect attachment to fixed, non-rotating base member 7.

Figure 6:
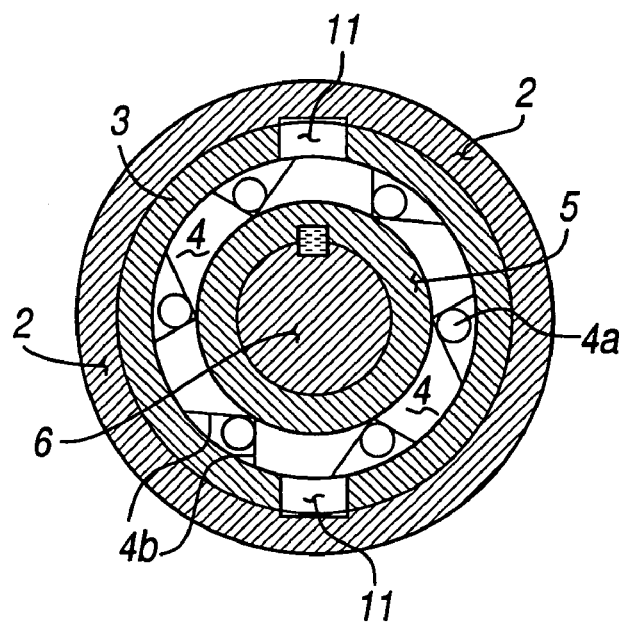
FIG. 6 is a cross-sectional view taken substantially along the plane 6—6 of FIG. 1.

Rotating members of the clutch assembly 20 include the inner clutch member 5 which is affixed through mechanical means (such as a key 5a and a keyway 6a) to the rotating shaft 6. The inner clutch member 5 is attached to the clutch mechanism 4 which is, in turn, connected to outer clutch member 3. As seen in FIG. 6, the clutch mechanism 4 includes a series of roller bearings 4a and ramps 4b. The roller bearings 4a and ramps 4b are adapted to permit the inner member 5 and shaft 6 to rotate in a normal direction without requiring the outer member 3 to rotate therewith. In addition, the roller bearings 4a and ramps 4b are adapted to prevent the inner member 5 and shaft 6 from rotating in a direction that is opposite to (or the reverse of) the normal direction, unless the outer clutch member 3 also rotates therewith.

Figure 2:
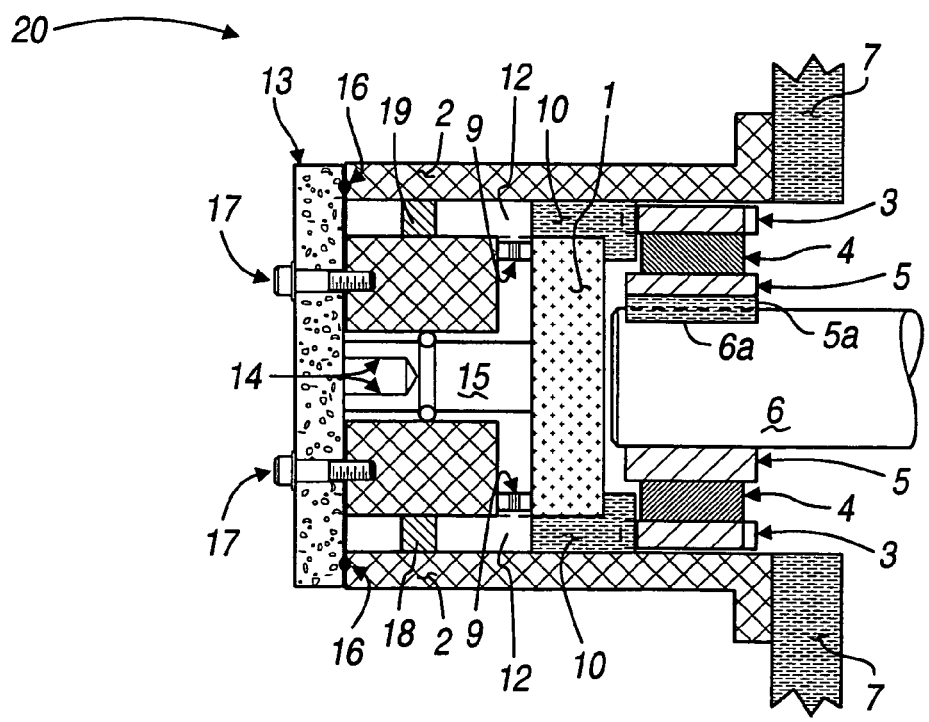
FIG. 2 is a longitudinal cross-sectional illustration of the preferred clutch assembly of FIG. 1 in the engaged state.
Figure 3:
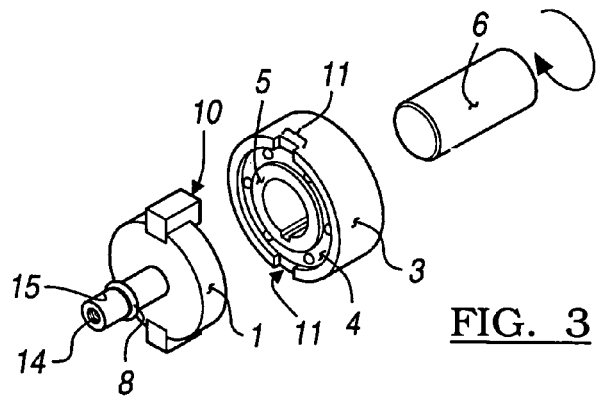
FIG. 3 is an exploded perspective view of certain structural internal components of the preferred clutch assembly of FIG. 1.

Referring to FIG. 2, during normal operation, the keys 10 are provided in an engaged or locked position. Specifically, the keys 10 extend into a face keyway 11 (seen best in FIG. 3) in the outer clutch member 3. Because the keys 10 are also located in the keyways 12 of the fixed, non-rotating housing 2, the keys 10 are in an engaged position that prevents the outer clutch member 3 from rotating in either direction. Thus, the keys 10 and the face keyways 11 operate as cooperating locking members. Therefore, in the engaged position, the outer clutch member 3 becomes a fixed, non-rotating member, since the keys 10 lock the outer clutch member 3 to the other non-rotating members, including the housing 2, the piston 1, and the base member 7. Since the outer clutch member 3 is prevented from rotating, the clutch mechanism 4 operates to permit the shaft 6 to rotate in the normal direction, but prevents the shaft 6 from rotating in an opposite direction.

Referring to FIG. 1, the keys 10 are illustrated in a disengaged or unlocked position. In the disengaged position, the keys 10 are withdrawn from the face keyways 11 of the outer clutch member 3. As a result, the outer clutch member 3 is released from the fixed, non-rotating members, including the housing 2, the piston 1, and the base member 7. Thus, the outer clutch member 3 is free to rotate in either direction with the shaft 6. Consequently, the operation of the clutch mechanism 4 does not prevent the shaft 6 from rotating in either direction. Thus, as described above, the keys 10 operate as locking members that engage and disengage the face keyways 11 of the clutch mechanism 4.

Returning to FIG. 2, the keys 10 are located in the engaged or locked position which permits the shaft 6 to rotate in the normal direction, and prevents the shaft 6 from rotating in the opposite direction. The engagement of keys 10 to face keyways 11 is mechanically maintained by an outer member in the form of a cover plate 13. The piston shaft 15 is of such a length that it is adapted to prevent the keys 10 affixed to piston 1 from being disengaged from the face keyways 11 while the cover plate 13 is attached flat against the end of the housing 2. Thus, an external feature such as the cover plate 13 is in contact with the piston 1 to maintain the mechanical interlock between the keys 10 and the face keyways 11 of the outer member 3 of the clutch 4. Thus, the cover plate 13 operates as an interference component adapted to interfere with the movement of the keys 10.

As illustrated, the cover plate 13 is secured in place to housing 2 with mechanical fasteners 17. Of course, any appropriate alternative method of fastening the cover plate 13 to the housing 2 may be used. For example, in one alternative (not seen) the cover plate 13 includes threads adapted to mate with cooperating threads on the housing 2. In another alternative (not seen), locking pins can be used to attach the cover plate 13 to the housing 2.

When the cover plate 13 is affixed against the housing 2 it also contacts against the protruding shaft 15 in such a manner as to provide direct contact between the cover plate 13, the protruding shaft 15, the piston 1, the affixed keys 10, and the face keyways 11 on the outer member 3. This direct contact cannot be disengaged without the removal of the cover plate 13. Thus, with the cover plate 13 attached against the housing 2, the shaft 6 is permitted to rotate in a single normal direction only. Accordingly, the shaft 6 is prevented from rotating in the opposite direction by the clutch mechanism 4 when the cover plate 13 or interference component is fully attached to the housing 2.

Figure 4:
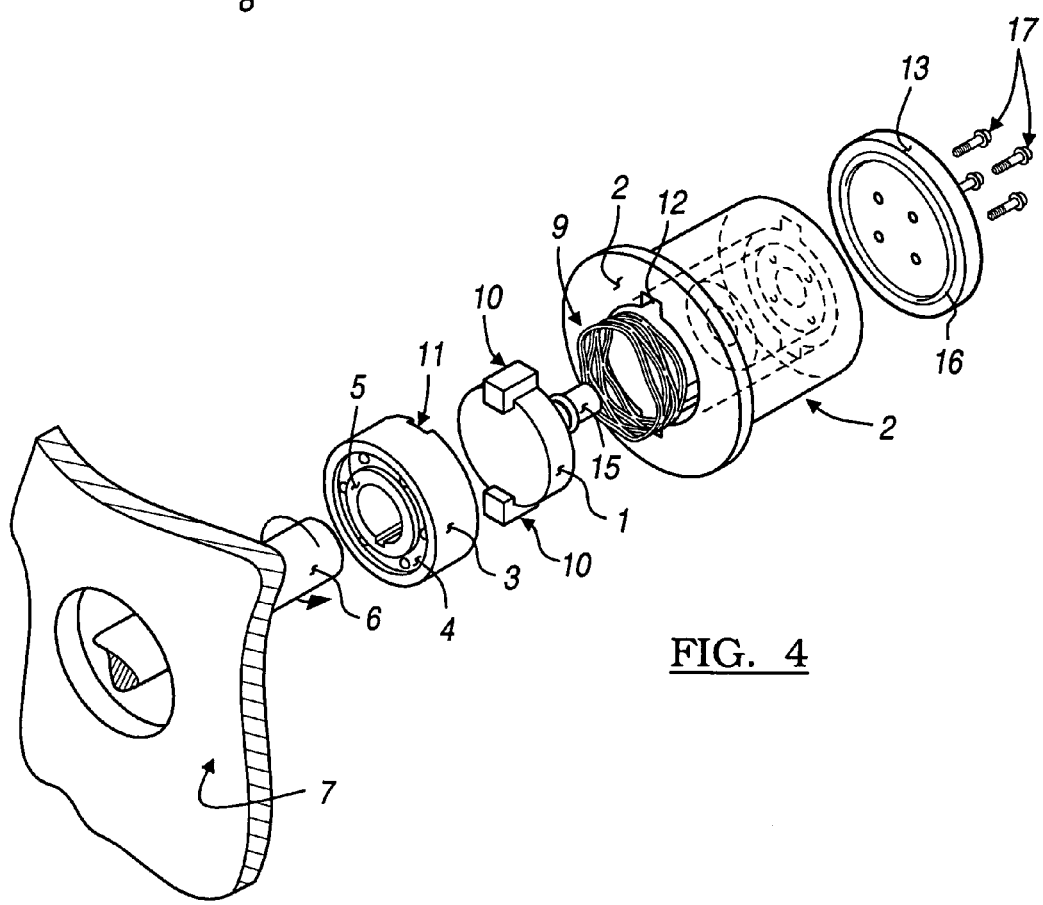
FIG. 4 is an exploded perspective view similar to FIG. 3, but seen from the other end and illustrating additional components.
Figure 5:
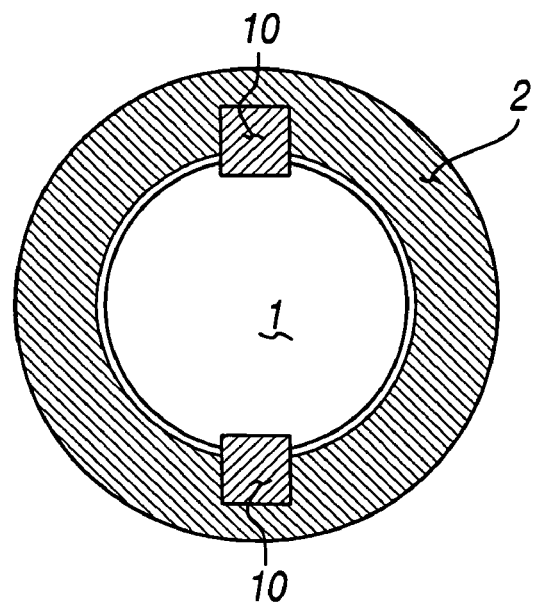
FIG. 5 is a cross-sectional view taken substantially along the plane 5—5 of FIG. 1.

Returning to FIG. 1, when it is desired to permit the shaft 6 to rotate in the opposite direction, the cover plate 13 must be removed from the housing 2. As indicated above, the keys 10 cannot be disengaged from the keyways 11 unless the cover plate 13 is removed. In addition, a spring 9 provides a biasing force tending to keep the keys 10 engaged in the face keyway 11. This biasing force must be overcome in order to disengage the keys 10 from the keyway 11. The spring 9 of this embodiment is illustrated in FIG. 4 as a metal wavy spring. Alternatively, the spring 9 can be provided as a plurality of metal coil springs.

In order to overcome this biasing force of the spring 9, a pulling tool (not seen) is attached to the piston shaft 15 using a manipulation feature. The manipulation feature is adapted to enable movement of the keys 10 between the engaged and disengaged position in response to manipulation from outside the interior space of the housing 2. As illustrated the manipulation feature is a threaded bore 14. The threaded bore 14 is not accessible until the cover plate 13 is removed from the housing 2. The pulling tool (not seen) includes a cooperating threaded member that engages the threaded bore 14 and typically pushes against the end of the housing 2 to pull the piston 1 and keys 10 out of engagement with the face keyways 11 of outer clutch member 3 against the biasing force of the spring 9. Although illustrated herein as a threaded bore 14 adapted for use with a pulling tool, the manipulation feature may be any feature capable of enabling removal of the keys 10 from the keyways 11; preferably, by pulling or pushing against the piston 1 and/or piston shaft 15.

In an alternative embodiment (not seen) the cover plate 13 and the pulling tool are provided as part of a single integrated component. For example, in one alternative (not seen) the end plate 13 includes an aperture through which a threaded member engages the piston shaft 15. The threaded member is in turn connected to the end plate 13 through a cam surface and/or pivot arm that is manipulated by an extending lever arm that can be moved into and locked in an engaged position and/or a disengaged position by a user. The engaged position and the disengaged position of the lever arm correspond to the engaged and disengaged positions of the keys 10, respectively. The release mechanism is designed to remain in the engaged position until it is intentionally manually manipulated by a user. For example, it can optionally be locked in the engaged position using a padlock (not seen).

Returning to the embodiment of FIG. 1, after the piston 1 has been pulled back and the affixed keys 10 are no longer engaged with the face keyways 11 on the outer member 3, the protruding shaft 15 will no longer allow the cover plate 13 to be positioned properly against the housing 2. The cover plate 13 and housing 2 are designed in such a manner as to provide a positive indication that the keys 10 are not engaged with the face keyways 11. Thus, any gap between the cover plate 13 and the housing 2 provides an indication that the rotating shaft 6 is potentially free to rotate in either direction. This indication is designed in such a manner as to serve as a visual warning to the operators of the machine that the machine is still capable of bi-directional operation. In addition or as an alternative to the visual warning, the clutch assembly 20 can be adapted to include an audio warning to operators. Accordingly, the clutch assembly 20 includes a visual and/or audible indication of the engagement status of the release mechanism.

With the release mechanism in the disengaged position, the shaft 6 is permitted to rotate in either direction. For example, the shaft 6 or the machine may be run in reverse in order to clear a jam. During such reverse operation, the cover plate 13 is not located in position against the housing 2 due to the piston shaft 15 as described above. As seen in the drawings, the clutch assembly 20 shares an interior with other components of the machine, including shaft 6. Lubricating fluid (not seen) is generally maintained in an interior space of the clutch assembly 20 to provide lubrication to the components thereof. This lubricating fluid is maintained in the interior space and foreign matter is maintained outside of the interior by internal seals; specifically, O-ring seal 8 and plug seals 18 and 19.

These internal seals 8, 18 and 19 are also configured to reduce the possibility of the external environment contaminating the interior space of housing 2, despite the removal of the cover plate 13. As illustrated, the internal seal 8 is an O-ring seal located around piston shaft 15 to seal the shaft to the housing 2. In addition, a plug seal 18, 19 is located in each passage through the housing 2 that results from the manufacture of the keyways 12. The internal seals 8, 18, 19 define an interior space to the right thereof as seen in FIGS. 1 and 2. This interior space is shared with an interior space of the machine partly defined by machine housing component 7. Thus, the clutch assembly 20 and the machine to which it is attached share lubricant and an interior space.

Of course, many alternative sealing arrangements are possible. For example, the passages blocked by plug seals 18, 19 could simply be eliminated by reducing the length of the keyways 12 so that they do not extend completely through the housing 2. Additional alternatives can include a lip seal (not seen), mechanical valve packing (not seen), or any other number of conventional seals. These seals can be configured to predominately prevent the passage of material from the interior space or into the interior space.

An external seal 16 is also provided at the attachment of the cover plate 13 to the housing 2. This external seal 16 is likewise configured to reduce the possibility of the external environment contaminating the interior of housing 2 and/or the possibility of lubricating fluid from the interior contaminating the external environment. This external seal 16 is also illustrated as an O-ring seal. Of course many alternative seals (not seen) can be used to reduce the possibility of the external environment contaminating the interior of housing 2 and/or the possibility of lubricating fluid from the interior contaminating the external environment, including a gasket, use of a sealant, or any other number of other conventional seals. In addition, it is understood that either, or both, the internal seal 8 and/or the external seal 16 can be selected, fabricated and/or utilized in such a manner as to particularly protect against the flow of material from the interior to the exterior, or from the exterior into the interior, or both.

After operation of the clutch assembly 20 in the disengaged position (for example, once the jam is removed), it will become desirable to reengage the clutch assembly 20 so that the shaft 6 can once again only rotate in the normal direction. The pulling tool is disengaged from the threaded bore 14, allowing the biasing force of the spring 9 to move the piston 1 toward the outer clutch member 3. Since the piston 1 and the affixed keys 10 do not rotate with the shaft 6, the inner member 5, the clutch mechanism 4 and the outer member 3 during the reverse direction operation of the shaft 6, the affixed keys 10 are likely not initially aligned with the face keyways 11 of the outer member 3.

The biasing force of the spring 9 pushes the affixed keys 10 against the face of outer member 3. When the rotating shaft 6 and, consequently, the outer member 3 is rotated enough to align the keys 10 (affixed to piston 1) with the face keyways 11 in the outer member 3, the spring 9 forces the keys 10 back into the face keyways 11 on the outer member 3. As illustrated in FIG. 4, the spring 9 of this embodiment is a wavy spring. Of course, many alternative biasing members may be provided, including for example a plurality of coil springs 9 as illustrated in FIGS. 1 and 2 for reasons of clarity. Beyond springs, bladders and other mechanisms can alternatively be used to provide this biasing force.

Only after the keys 10 are fully and properly engaged with the face keyways 11 does the protruding shaft 15 allow the cover plate 13 to be properly positioned, indicating that the rotating shaft 6 can only rotate in one direction. Thus, the elimination of any gap between the cover plate 13 and the housing 2 provides a positive indication of engagement between the keys 10 and the keyway 11. In the alternative embodiment including the extending lever arm as described above, a positive indication of engagement may be provided by the positioning and locking of the lever arm in an engaged position. Further, the indication of engagement may be the lack of an audible warning as additionally alternatively described above.

Only a small number of the many possible alternatives are described above. Many additional modifications and alternatives beyond those described above, may be envisioned by those skilled in the art. For example, although this invention has been illustrated as an external attachment to a machine including housing component 7, the housing 2 shown in these illustrations could well be designed as an integral part of a gear frame, motor end cap, or other such device where a backstopping, overrunning, indexing and/or overload protection clutch can and are used. As an additional example, the keys 10 affixed to the piston 1 are illustrated as conventional square keys, but can be of any other appropriately desired shape. As another example, an alternative clutch mechanism configuration can eliminate the inner clutch member, the outer clutch member or both, thereby resulting in appropriate adaptation of the keys 10 and members 11.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A clutch assembly comprising:
a fixed, non-rotating housing having a housing keyway and defining an interior space;
a clutch mechanism connecting a rotating shaft to an outer member of the clutch mechanism having a clutch keyway, the clutch mechanism being adapted to permit the shaft to rotate in a normal direction and to prevent the shaft from rotating in a reverse direction when the outer member is rotationally fixed to the housing, the clutch mechanism being further adapted to permit the shaft to rotate in both the normal direction and the reverse direction when the outer member is not rotationally fixed to the housing;
a key adapted to be moved into an engaged position wherein the key extends into both the housing keyway and the clutch keyway to rotationally fix the outer member of the clutch mechanism to the housing, and the key being adapted to be moved into a disengaged position wherein the key does not extend into both the housing keyway and the clutch keyway, thereby permitting the outer member of the clutch mechanism to rotate relative to the housing;
a piston to which the key is attached, the piston having a shaft being adapted to enable movement of the key between the engaged position and the disengaged position; and
a cover plate attached to the housing and adapted to interfere with the shaft of the piston to maintain the key in the engaged position while the cover plate is attached to the housing.

2. A clutch assembly according to claim 1, wherein the housing keyway is a plurality of longitudinal keyways and wherein the clutch keyway is a plurality of face keyways.

3. A clutch assembly according to claim 1, further comprising a threaded bore in the shaft adapted to enable movement of the key from the engaged position to the disengaged position.

4. A clutch assembly according to claim 1, further comprising a biasing member adapted to apply a biasing force on the piston tending to move the key into the engaged position upon alignment of the key with the clutch keyway.

5. A clutch assembly according to claim 1, further comprising a seal that is adapted, during movement of the shaft in the reverse direction, to maintain lubricant inside the interior space, to maintain any external contaminant outside of the interior space, or both.

6. A clutch assembly comprising:
a fixed, non-rotating housing having a housing keyway and defining an interior space;
a clutch mechanism connecting a rotating shaft to an outer member of the clutch mechanism having a clutch keyway, the clutch mechanism being adapted to permit the shaft to rotate in a normal direction and to prevent the shaft from rotating in a reverse direction when the outer member is rotationally fixed to the housing, the clutch mechanism being further adapted to permit the shaft to rotate in both the normal direction and the reverse direction when the outer member is not rotationally fixed to the housing;
a key adapted to be moved into an engaged position wherein the key extends into both the housing keyway and the clutch keyway to rotationally fix the outer member of the clutch mechanism to the housing, and the key being adapted to be moved into a disengaged position wherein the key does not extend into both the housing keyway and the clutch keyway, thereby permitting the outer member of the clutch mechanism to rotate relative to the housing;
a piston to which the key is attached, the piston having a shaft being adapted to enable movement of the key between the engaged position and the disengaged position; and
a threaded bore in the shaft of the piston adapted to enable movement of the key from the engaged position to the disengaged position.

7. A clutch assembly according to claim 6, wherein the housing keyway is a plurality of longitudinal keyways and wherein the clutch keyway is a plurality of face keyways.

8. A clutch assembly according to claim 6, further comprising a cover plate attached to the housing and adapted to interfere with the shaft of the piston to maintain the key in the engaged position while the cover plate is attached to the housing.

9. A clutch assembly according to claim 6, further comprising a biasing member adapted to apply a biasing force on the piston tending to move the key into the engaged position upon alignment of the key with the clutch keyway.

10. A clutch assembly according to claim 6, further comprising a seal that is adapted, during movement of the shaft in the reverse direction, to maintain lubricant inside the interior space, to maintain any external contaminant outside of the interior space, or both.

* * * * *